(12) United States Patent
Chao et al.

(10) Patent No.: US 8,020,606 B2
(45) Date of Patent: Sep. 20, 2011

(54) METHOD OF MAKING A WAX MOLD FOR A GOLF CLUB HEAD

(75) Inventors: Hsiao-Wen Chao, Ping-Tung Hsien (TW); Lung-Sheng Sun, Ping-Tung Hsien (TW); Yung-Yueh Liu, Ping Tung Hsien (TW)

(73) Assignee: O-TA Precision Industry Co. Ltd., Ping-Tung Hsien (TW)

( * ) Notice: Subject to any disclaimer, the term of this patent is extended or adjusted under 35 U.S.C. 154(b) by 459 days.

(21) Appl. No.: 12/210,924

(22) Filed: Sep. 15, 2008

(65) Prior Publication Data

US 2010/0065240 A1 Mar. 18, 2010

(51) Int. Cl.
*B22C 9/00* (2006.01)
*B22C 7/00* (2006.01)
(52) U.S. Cl. ............... 164/516; 164/35; 164/44; 164/45; 264/225; 473/335

(58) Field of Classification Search ............... 164/35, 164/44, 45, 132, 516; 264/220, 225, 227; 473/334–339
See application file for complete search history.

(56) References Cited

U.S. PATENT DOCUMENTS

| 2005/0140050 A1* | 6/2005 | Tsai et al. ............. 264/219 |
| 2008/0090674 A1* | 4/2008 | Kubota et al. ......... 473/334 |

* cited by examiner

*Primary Examiner* — Kuang Lin
*Assistant Examiner* — Kevin E Yoon
(74) *Attorney, Agent, or Firm* — Kilpatrick Townsend & Stockton LLP

(57) ABSTRACT

A method of making a wax mold for a golf club head includes the steps of: a) positioning a male die in a cavity of a female die; b) injecting and filling dissolvable wax into a gap between an outer surface of the male die and an inner surface of the female die; c) cooling and solidifying the dissolvable wax in the gap to obtain a wax shell; d) removing the wax shell from the male die and the female die, the wax shell being provided with a hole extending through inner and outer surfaces of the wax shell; and e) inserting a wax plug into the hole to form the wax mold.

7 Claims, 6 Drawing Sheets

METHOD OF MAKING A WAX MOLD FOR A GOLF CLUB HEAD

BACKGROUND OF THE INVENTION

1. Field of the Invention

The invention relates to a method of making a wax mold, more particularly to a method of making a wax mold for a golf club head.

2. Description of the Related Art

Referring to FIG. 1, a conventional method of making a wax mold for a golf club head includes steps of positioning a male die 12 in a cavity 11 of a female die 10, injecting dissolvable wax into the cavity 11 to form a wax mold, and removing the solidified wax mold from the male and female dies 12, 10. The wax mold made thereby is used for the subsequent steps for making the golf club head.

However, referring to FIG. 2, when a wax mold 14 to be made has a relatively complicated profile, it is relatively difficult to disassemble and remove the male die 12, which has a relatively complicated profile corresponding to that of the wax mold 14, from the wax mold 14. Therefore, the flexibility of the conventional method is limited.

Referring to FIGS. 3 and 4, U.S. Pat. No. 7,314,586 discloses a method of making a wax mold 19 for a golf club head, which includes steps of injecting and filling a first dissolvable wax into a first cavity 15 of a first mold 14, cooling and solidifying the first dissolvable wax in the first cavity 15 to obtain a dissolvable mold core 16, removing the dissolvable mold core 16 from the first mold 14, mounting the dissolvable mold core 16 into a second mold cavity 18 of a second mold 17 to define a gap between an outer surface of the mold core 16 and an inner surface of the second mold 17, injecting and filling a second dissolvable wax into the gap, cooling and solidifying the second dissolvable wax in the gap to obtain a wax mold 19, and dissolving and flowing the dissolvable mold core 16 out of the wax mold 19.

Although the method disclosed in the U.S. patent can be used to make a wax mold having a relatively complicated profile, it is required to make the dissolvable mold core 16 using the first mold 14 prior to the manufacture of the wax mold 19 using the second mold 17. Therefore, the method is time-consuming and costly.

SUMMARY OF THE INVENTION

Therefore, the object of the present invention is to provide a method of making a wax mold for a golf club head which is relatively simple and cost-effective.

Accordingly, the method of making a wax mold for a golf club head of this invention includes the steps of: a) positioning a male die in a cavity of a female die; b) injecting and filling dissolvable wax into a gap between an outer surface of the male die and an inner surface of the female die; c) cooling and solidifying the dissolvable wax in the gap to obtain a wax shell; d) removing the wax shell from the male die and the female die, the wax shell being provided with a hole extending through inner and outer surfaces of the wax shell; and e) inserting a wax plug into the hole to form the wax mold.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
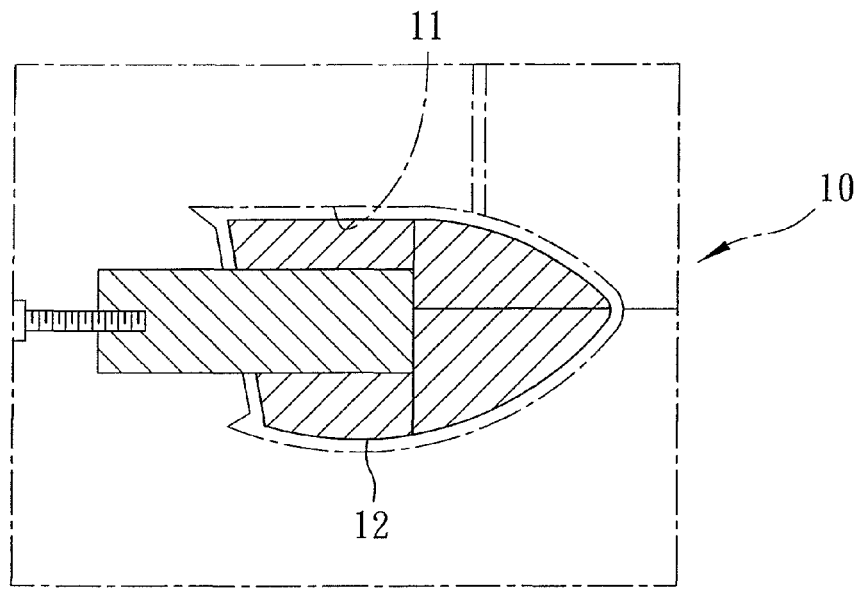
FIGS. 1 and 2 are partly sectional views illustrating a conventional method of making a wax mold for a golf club head.
Figure 2:
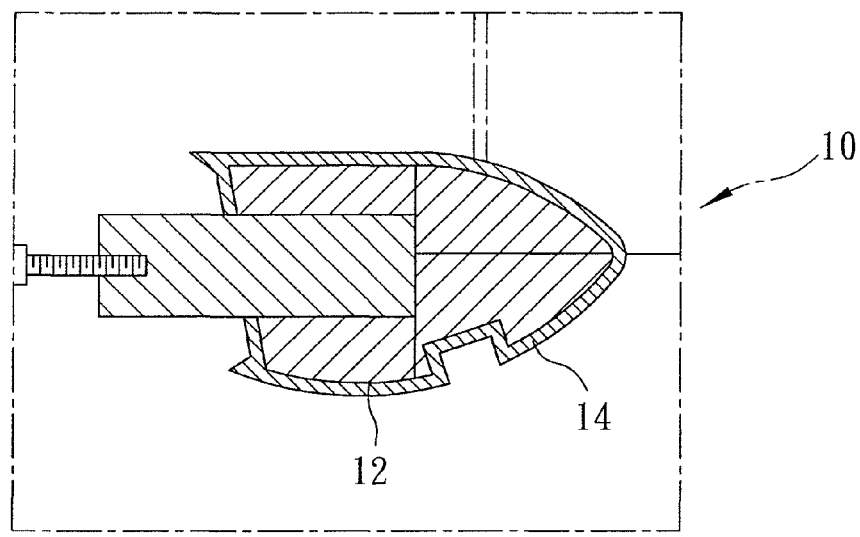
Figure 3:
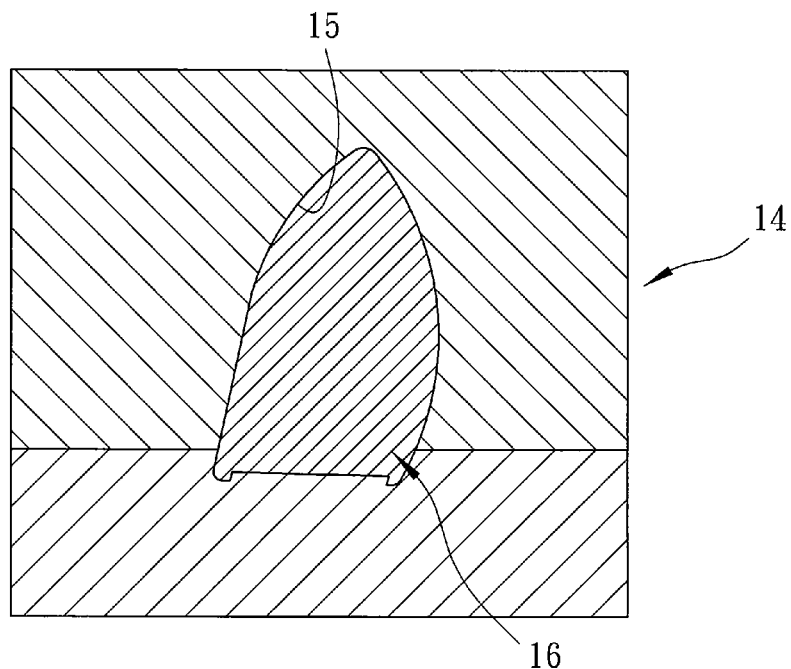
FIGS. 3 and 4 are sectional views illustrating consecutive steps of another conventional method of making a wax mold for a golf club head.
Figure 4:
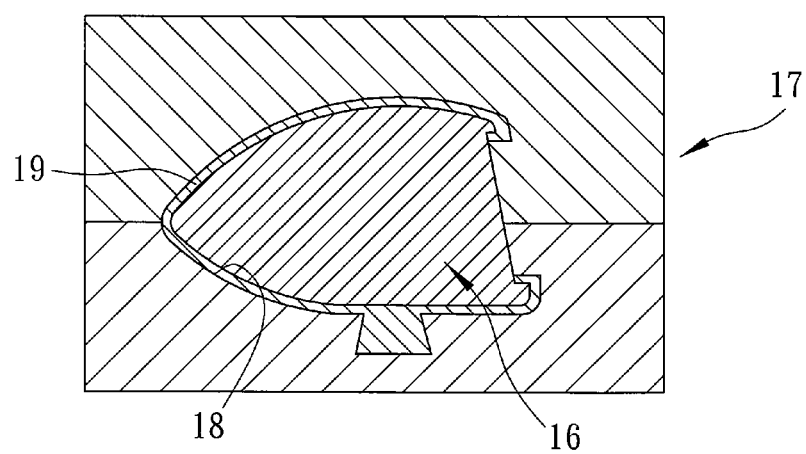

Before the present invention is described in greater detail, it should be noted that like elements are denoted by the same reference numerals throughout the disclosure.

Figure 5:
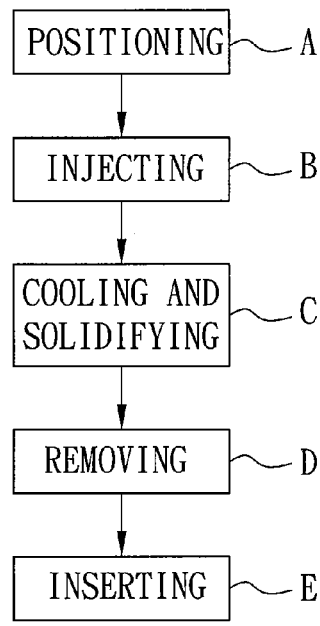
FIG. 5 is a flow chart of a first preferred embodiment of a method of making a wax mold for a golf club head according to this invention.
Figure 6:
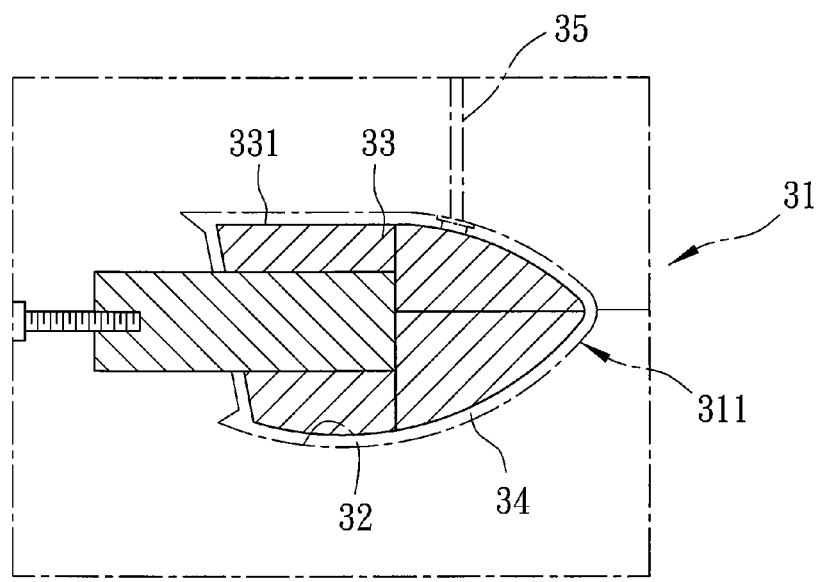
FIGS. 6 to 8 are views illustrating consecutive steps of the first preferred embodiment.

Referring to FIG. 5, the first preferred embodiment of a method of making a wax mold for a golf club head according to this invention is shown to include the steps of:

A) Positioning:

Referring to FIG. 6, a male die 33 is positioned in a cavity 32 of a female die 31 so as to define a gap 34 between an outer surface 331 of the male die 33 and an inner surface 311 of the female die 31. The female die 31 is provided with an injecting hole 35 communicated with the cavity 32 of the female die 31.

B) Injecting:

Dissolvable wax is injected and filled into the gap 34 via the injecting hole 35.

Figure 7:
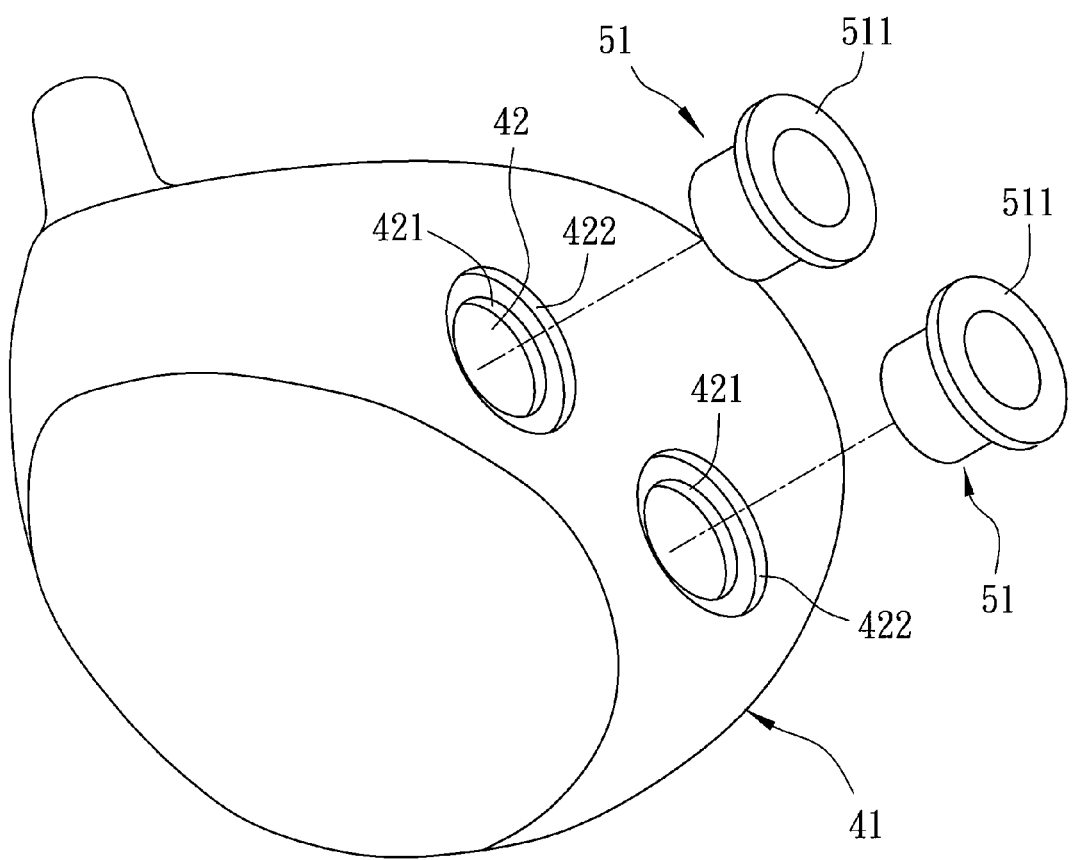

C) Cooling and Solidifying:

Referring to FIGS. 6 and 7, the dissolvable wax in the gap 34 is cooled and solidified to obtain a wax shell 41.

D) Removing:

The wax shell 41 is removed from the male die 33 and the female die 31. The wax shell 41 is provided with two holes 42, each of which extends through inner and outer surfaces 411, 412 (see FIG. 8) of the wax shell 41. Each of the holes 42 is stepped to have a large hole section 422 extending through the outer surface 412 of the wax shell 41, and a small hole section 421 extending through the inner surface 411 of the wax shell 41. It should be noted that the number of the holes 42 can be varied according to the specific requirement for the golf club head to be made.

Figure 8:
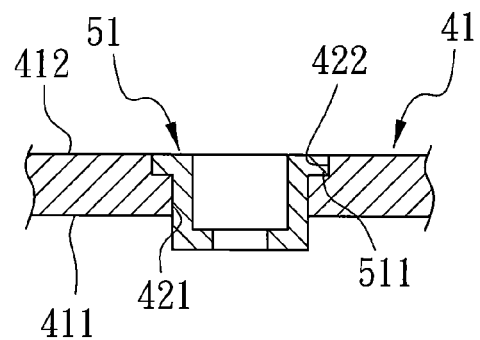

E) Inserting:

Referring to FIGS. 7 and 8, two wax plugs 51 are preformed from dissolvable wax, and are inserted into the respective holes 42 and glued to the wax shell 41 to form the wax mold. The wax plugs 51 project partially from the inner surface 411 of the wax shell 41 (only one is shown in FIG. 8). In this preferred embodiment, each wax plug 51 is tubular, and has a flange part 511 fitted in the large hole section 422 of the respective hole 42.

Figure 9:
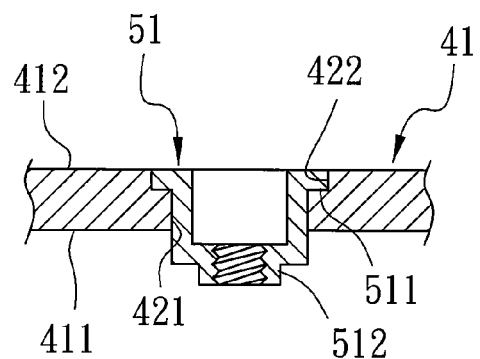
FIG. 9 is a fragmentary sectional view illustrating a second preferred embodiment of a method of making a wax mold for a golf club head according to this invention.

Referring to FIGS. 5 and 9, the second preferred embodiment of a method of making a wax mold for a golf club head according to this invention is similar to the first preferred embodiment, except that one of the wax plugs 51 further includes an internally threaded part 512 projecting inwardly of the wax shell 41. The internally threaded part 512 serves to provide a golf club head with an internally thread usable for attachment of a counterweight.

Figure 10:
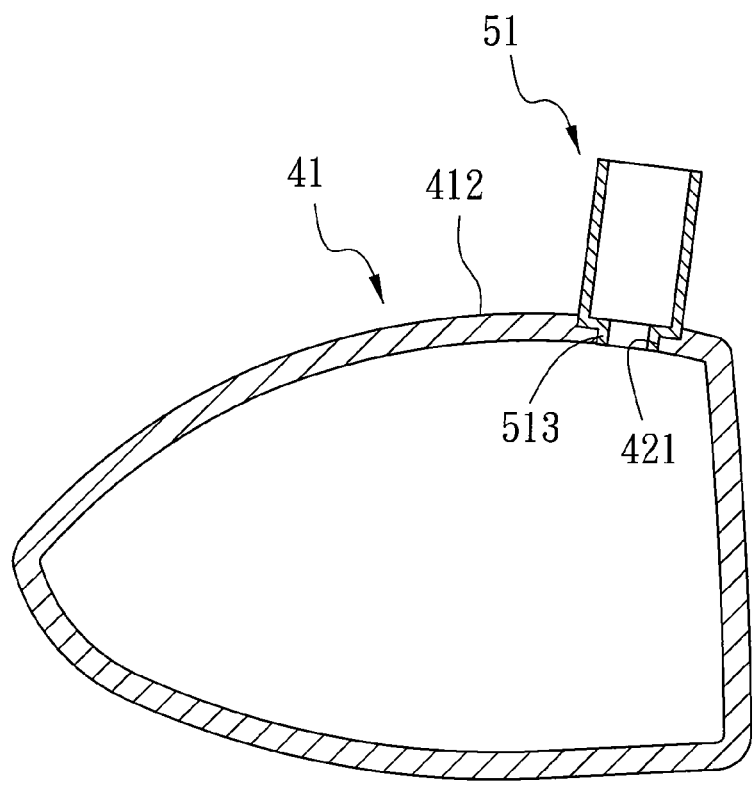
FIG. 10 is a fragmentary sectional view illustrating a third preferred embodiment of a method of making a wax mold for a golf club head according to this invention.

Referring to FIGS. 5 and 10, the third preferred embodiment of a method of making a wax mold for a golf club head according to this invention is similar to the first preferred embodiment, except that the wax plug 51 is tubular, projects outwardly from the outer surface 412 of the wax shell 41, and has a neck part 513 inserted into the small hole section 421 of the wax shell 41. The outwardly projecting wax plug 51 is used to form a neck for a golf club head, which can be connected to a golf club shaft.

In view of the aforesaid, various wax molds having complicated profiles can be made according to the method of this invention using the wax plug 51 having a shape specific to the golf club head to be made. Furthermore, the method of this invention is relatively simple as compared to the method disclosed in the aforesaid U.S. patent.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method of making a wax mold for a golf club head, comprising the steps of:
   a) positioning a male die in a cavity of a female die;
   b) injecting and filling dissolvable wax into a gap between an outer surface of the male die and an inner surface of the female die;
   c) cooling and solidifying the dissolvable wax in the gap to obtain a wax shell;
   d) removing the wax shell from the male die and the female die, the wax shell being provided with a hole extending through inner and outer surfaces of the wax shell; and
   e) inserting a wax plug into the hole to form the wax mold, the wax plug projecting partially from at least one of the inner and outer surfaces of the wax shell.

2. The method as claimed in claim 1, wherein the wax plug is glued to the wax shell.

3. The method as claimed in claim 2, wherein the hole is stepped to have a large hole section and a small hole section.

4. The method as claimed in claim 3, wherein the large hole section extends through the outer surface of the wax shell, and the small hole section extends through the inner surface of the wax shell.

5. The method as claimed in claim 4, wherein the wax plug is tubular, projects from the inner surface of the wax shell, and has a flange part fitted in the large hole section.

6. The method as claimed in claim 5, wherein the wax plug further includes an internally threaded part projecting inwardly of the wax shell.

7. The method as claimed in claim 4, wherein the wax plug is tubular, projects outwardly from the outer surface of the wax shell, and has a neck part inserted into the small hole section of the wax shell.

* * * * *